(12) United States Patent
Podkopayev

(10) Patent No.: US 7,051,614 B2
(45) Date of Patent: May 30, 2006

(54) QUIET APPLY PUSH TO RELEASE PARKING BRAKE PEDAL

(75) Inventor: Vadym Podkopayev, Toronto (CA)

(73) Assignee: Intier Automotive Closures Inc., Newmarket (CA)

( * ) Notice: Subject to any disclaimer, the term of this patent is extended or adjusted under 35 U.S.C. 154(b) by 0 days.

(21) Appl. No.: 10/996,662

(22) Filed: Nov. 24, 2004

(65) Prior Publication Data

US 2005/0160868 A1    Jul. 28, 2005

Related U.S. Application Data

(60) Provisional application No. 60/524,789, filed on Nov. 25, 2003.

(51) Int. Cl.
    *G05G 1/14*    (2006.01)
(52) U.S. Cl. .............................. 74/512; 74/516; 74/517; 74/518; 74/527
(58) Field of Classification Search ................ 74/512, 74/516, 517, 518, 527, 529, 540; 180/271; G05G 1/14; B60T 7/10
    See application file for complete search history.

(56) References Cited

U.S. PATENT DOCUMENTS

| 2,905,024 | A |   | 9/1959  | McCarthey et al. |
|-----------|---|---|---------|------------------|
| 4,278,143 | A |   | 7/1981  | Nagai            |
| 4,281,736 | A | * | 8/1981  | Lizzio ........................ 180/271 |
| 4,872,368 | A |   | 10/1989 | Porter           |
| 5,131,288 | A |   | 7/1992  | Barlas           |
| 5,217,094 | A |   | 6/1993  | Walter et al.    |
| 5,309,786 | A |   | 5/1994  | Pare et al.      |
| 5,327,797 | A |   | 7/1994  | Seifrit, Jr.     |

(Continued)

FOREIGN PATENT DOCUMENTS

DE          019508511 A1 *  9/1996

*Primary Examiner*—Vinh T. Luong
(74) *Attorney, Agent, or Firm*—Clark Hill PLC

(57) ABSTRACT

A quiet apply push to release control pedal system includes a frame to mount the system to a vehicle. The frame also includes a geared rack and a pedal arm and a quiet apply carriage are rotatably mounted to the frame. The quiet apply carriage has a geared quiet apply mechanism which engages the geared rack and a cable carrier to which a control cable can be attached. Pushing the pedal moves the carriage to tension a control cable attached thereto by rotating the quiet apply mechanism along the geared rack. The quiet apply mechanism includes a clutch which prevents the gear from rotating in a direction to release the tension in the cable unless the clutch is released. The carriage also includes a pawl and toggle mechanism which locks the pedal arm to rotate with the carriage to tension the cable when the pedal is first pressed. The pawl and toggle unlocks the pedal from the carriage after the cable has been tensioned so that pressing the pedal then rotates the pedal with respect to the carriage, a release tab on the pedal arm abutting the clutch to release it to allow the tension to be removed from the cable. A retainer spring keeps the release tab in abutment with the release of the clutch until the release engages a release surface on the rack which keeps the clutch released until the pedal and carriage have returned to their initial positions, where the cable is not tensioned, and the pawl re-locks the pedal to the carriage.

1 Claim, 7 Drawing Sheets

U.S. PATENT DOCUMENTS

| | | |
|---|---|---|
| 5,335,563 A | 8/1994 | Yamamoto et al. |
| 5,528,956 A * | 6/1996 | Harger et al. ............. 74/517 |
| 5,588,335 A | 12/1996 | Strait |
| 5,775,174 A | 7/1998 | Kanbe et al. |
| 5,832,784 A * | 11/1998 | McCallips et al. ......... 74/512 |
| 5,875,688 A | 3/1999 | Porter et al. |
| 2003/0084743 A1 | 5/2003 | Djordjevic |
| 2003/0084745 A1 | 5/2003 | Joo |
| 2003/0132070 A1 | 7/2003 | Gross et al. |
| 2004/0035239 A1 | 2/2004 | Bohm |

* cited by examiner

QUIET APPLY PUSH TO RELEASE PARKING BRAKE PEDAL

This claims benefit of 60/524,789 filed Nov. 25, 2003.

FIELD OF THE INVENTION

The present invention relates to a vehicle control pedal. More specifically, the present invention relates to a vehicle control pedal, such as a parking brake pedal or the like, which employs quiet apply technology and which is pushed to tension a control cable and which is subsequently pushed again to release the tension in the cable.

BACKGROUND OF THE INVENTION

Control pedals for vehicle are well known. Some such pedals actuate mechanical linkages to hydraulic master cylinders and tension and release control cable, such as accelerator or parking brake cables. Conventional parking brake pedal mechanisms typically have a release handle to release the pedal to remove tension from the control cable or, more recently, a push to release pedal mechanism is offered wherein the parking brake is actuated by first pressing the brake pedal and is subsequently released by again pressing the brake pedal.

Examples of push to release pedal systems include U.S. Pat. No. 4,872,368 to Porter; U.S. Pat. No. 5,217,094 to Walter et al.; U.S. Pat. No. 5,588,335 to Strait; and U.S. Pat. No. 5,775,174 to Kanbe et al.

The above-described pedal activated parking brake systems conventionally employ a ratchet and pawl arrangement to lock the mechanism in the engaged position to maintain the tension on the parking brake cable. While such systems work well, they do suffer from a disadvantage in that, when the brake is set, the pawl is dragged across on the teeth of the ratchet resulting in a relatively loud noise which is apparent to the vehicle operator.

To eliminate this noise, a "quiet apply" brake systems have been created. Published U.S. patent application 2003/0084743 teaches one such system which is a simple and effective quiet apply mechanism and the contents of that applications are incorporated herein by reference. This quiet apply mechanism employs a clutch spring which maintains a cam biased against a stop and which maintains the tension in the parking brake cable. When a release actuator is operated by a driver, tension is removed from the clutch spring, allowing the cam to release from the stop and releasing the tension in the brake cable.

To date, no one has offered a quiet apply mechanism in a push to release parking brake system.

SUMMARY OF THE INVENTION

It is an object of the present invention to provide a novel quiet apply push to release control pedal system which obviates or mitigates at least one disadvantage of the prior art.

According to a first aspect of the present invention, there is provided a quiet apply push to release control pedal system to apply and remove tension form a control cable, comprising: a frame for attachment to a vehicle; a geared rack spaced from and mounted to the frame; a pedal arm rotatably mounted to a pivot pin on the frame, the pedal arm having a pedal at one end and a release tab at the other end; a quiet apply carriage rotatably mounted to the pivot pin, the quiet apply carriage including: a cable carrier to which the control cable is attached; a pawl and toggle mechanism, the paw engaging the pedal arm, when the pedal arm is pushed to tension the control cable, to rotate the carriage with the pedal about the pivot pin and the toggle disengaging the pawl from the pedal when the pedal is released after tensioning the cable to allow the pedal to rotate with respect to the carriage and the frame; a quiet apply mechanism including a clutch hub, a clutch spring surrounding the clutch hub and a gear attached to the clutch hub and having teeth complementary to those of the geared rack, the gear engaging the geared rack to rotate the clutch hub when the carriage is rotated on the pivot pin, the clutch spring being biased into engagement with the clutch hub to prevent removal of tension from the control cable until a release end of the clutch spring is pressed by the release tab of the pedal arm when the pedal is pressed to release tension from the cable; and a retainer spring having a first end fixed to the carriage, a free distal end having a an inclined portion and a detent portion intermediate the fixed and the inclined end, the detent maintaining the release tab of the pedal arm engaged with the release end of the clutch spring when the pedal is pressed to release the tension in the control cable until the release tab engages a release surface on the carriage and the inclined end then abuts a release surface on the carriage to deform the spring to disengage the release tab when the pedal and carriage have returned to the disengaged position and wherein the pawl re-engages the pedal arm.

According to another aspect of the present invention, there is provided a push to release parking brake pedal system, comprising: a frame for mounting to a vehicle; a geared rack attached to the frame; a carriage rotatably mounted to the frame; a pedal arm rotatably mounted to the carriage and frame; the carriage including a quiet apply cable mechanism which engages the geared rack when the pedal is first pressed to tension the cable as the mechanism moves along the geared rack to tension the cable, the quiet apply cable mechanism including a clutch preventing the mechanism from moving back along the geared rack to release tension in the cable until the clutch is released; the carriage further including pawl means to lock the pedal arm to the carriage when the pedal is first pressed to tension the cable and to disengage the pedal arm from the carriage once the cable is tensioned; the pedal arm including a release tab to disengage the clutch when the disengaged pedal arm is pressed to release the cable tension, the quiet apply mechanism moving a long the geared rack to rotate the cable carrier and release the tension in the cable; and the carriage further including a retainer spring to maintain the release tab in engagement with the clutch until the release tab engages a release surface on the carriage and the cable tension is released.

The present invention provides a push to release control pedal system which employs a quiet apply mechanism and which is reliable and yet relatively simple to construct. The present invention also provides a push to release control pedal system wherein the initial push force required to start the release of tension in the control cable is independent of the tension in the cable.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
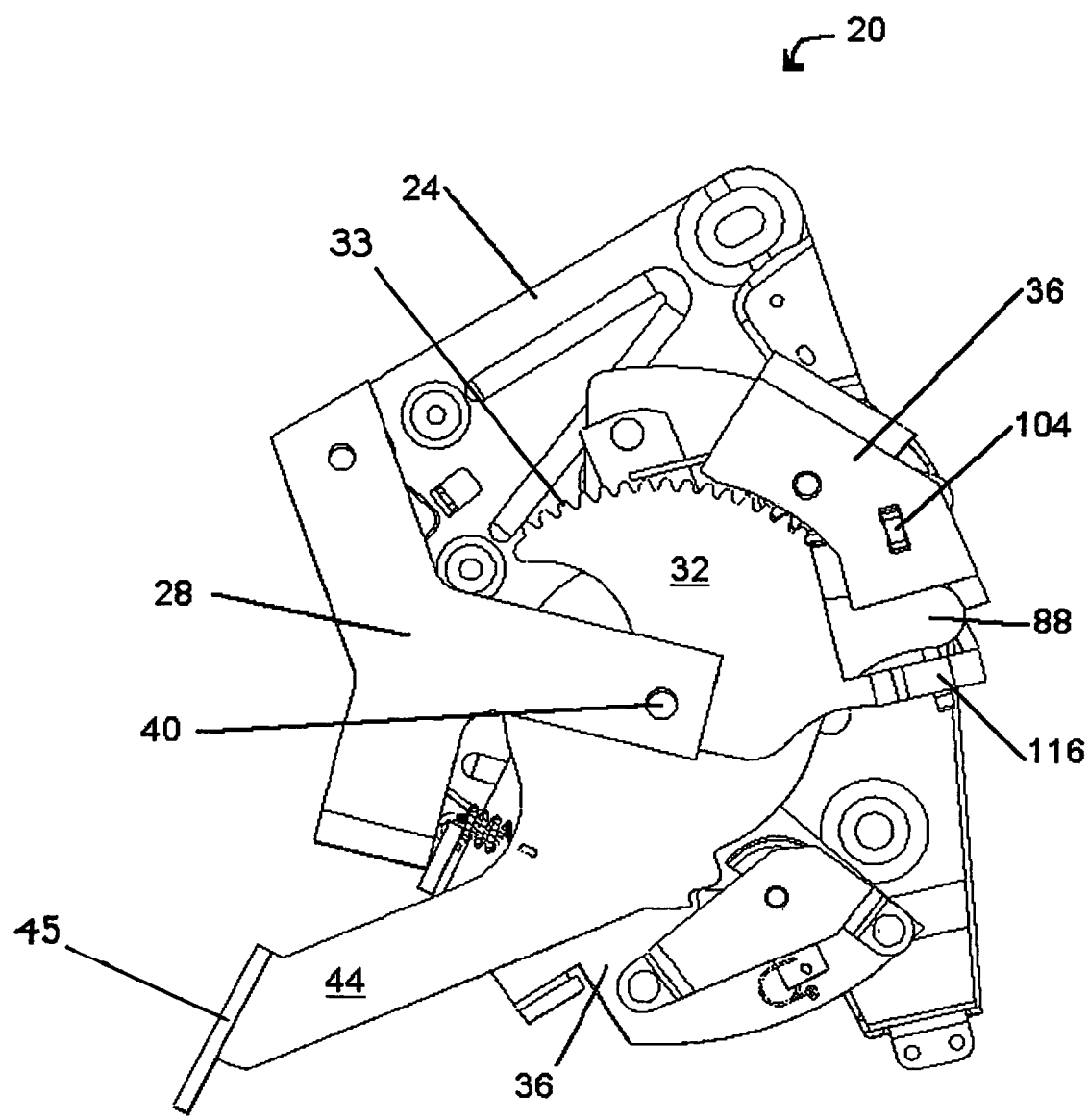
FIG. 1 shows a side view of a parking brake system in accordance with the present invention in a disengaged position.

A push to release brake system is indicated generally at 20 in FIG. 1. System 20 includes a back frame 24, by which system 20 can be mounted in a vehicle and a carriage frame 28 and a geared rack 32 both of which are mounted to back frame 24.

A quiet apply carriage 36 is rotatably mounted to back frame 24, via a pivot pin 40 which extends from back frame 24 to carriage frame 28 and geared rack 32 having teeth 33, and a pedal arm 44 is rotatably mounted to a carriage 36 via pivot pin 40 as well. The pedal arm 44 includes a pedal 45 at one end and a release tab 88 at another end.

Figure 2:
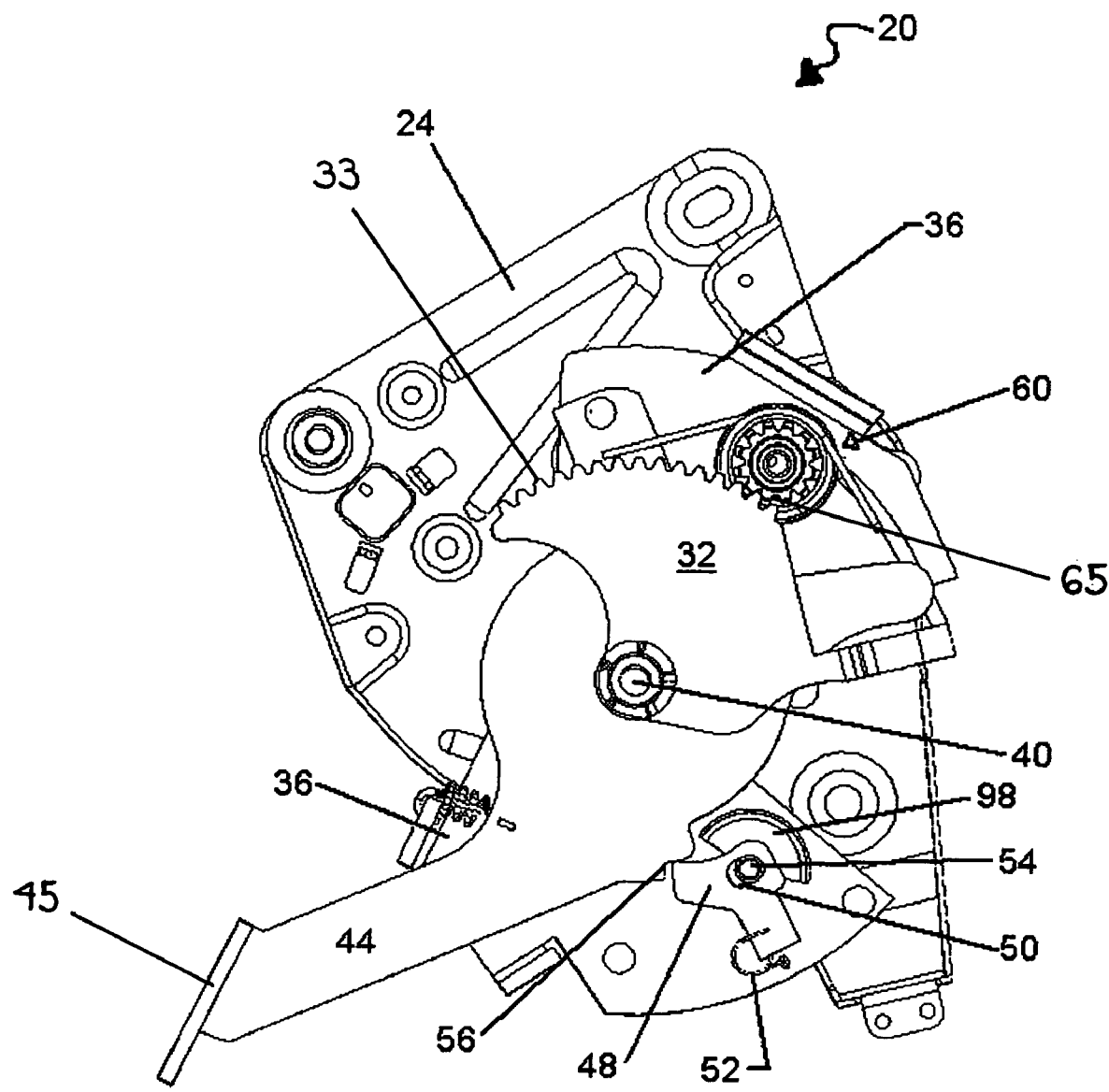
FIG. 2 shows the side view of FIG. 1 with a section through some components to show portions of the inner mechanism.

A pawl 48, best seen in FIG. 2 wherein its retaining cover has been removed, is mounted on carriage 36 and is biased by a coil spring 52 to engage a notch 56 in pedal arm 44 when system 20 is in its disengaged position (as shown in FIG. 2). Pawl 48 is mounted to carriage 36 via an eccentric bore 50 which receives a pin 54 from carriage 36.

Figure 3:
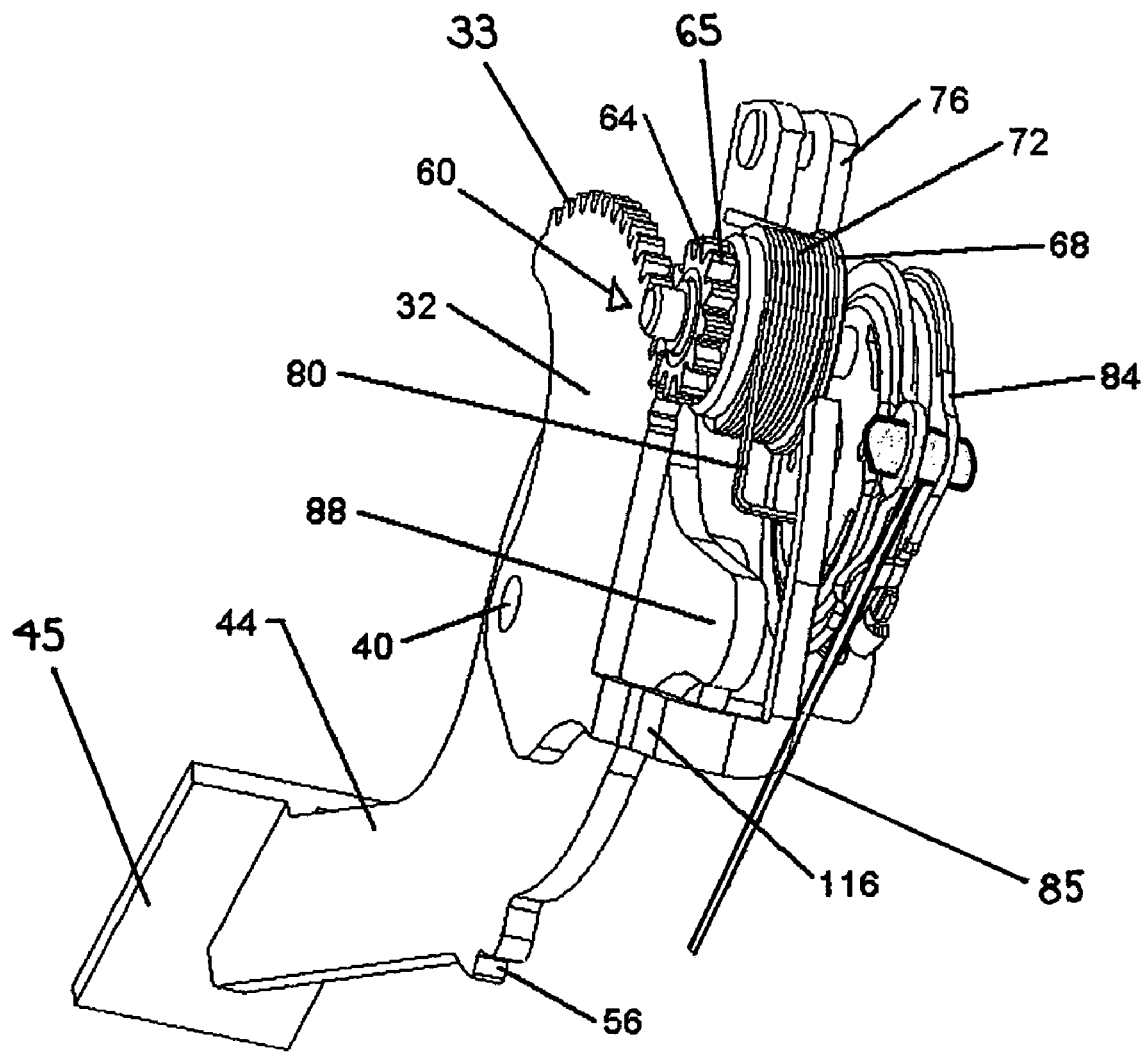
FIG. 3 shows a perspective view of a pedal arm, geared rack and quiet apply mechanism of the system of FIG. 1.

Carriage 36 also has a quiet apply mechanism 60 mounted on it. As best shown in FIG. 3, mechanism 60 includes a gear 64, having complementary teeth 65 to the teeth 33 of geared rack 32, which is fixed to a clutch hub 68. Clutch hub 68 is rotatably mounted to carriage 36 and is encircled by a clutch spring 72 which has one end fixed to carriage 36 by mount 76 and a second end which extends from hub 68 and operates as a release end 80. Also attached to carriage 36 is a cable carrier 84 which can receive the end of a control cable 85 such as a parking brake cable or the like. When gear 64 rotates along the teeth 33 of geared rack 32, cable carrier 84 moves to tension the attached control cable 85 as gear 64 moves with carriage 36 away from the position shown in FIGS. 1 and 2.

In the illustrated embodiment, clutch hub 68 is free to rotate in a counterclockwise direction (when viewed as shown in FIG. 2) as this rotation direction is counter to the winding direction of clutch spring 72 and clutch hub 68 will "slip" within clutch spring 72. However, if clutch hub 68 is rotated clockwise, clutch spring 72 will tighten around clutch hub 68 and prevent its rotation. To release clutch hub 68 for clockwise rotation, release end 80 of clutch spring 72 must be moved counterclockwise, to remove the tension from clutch spring 72. As shown, pedal arm 44 includes the release tab 88 to so move release end 80, as described below.

Figure 4:
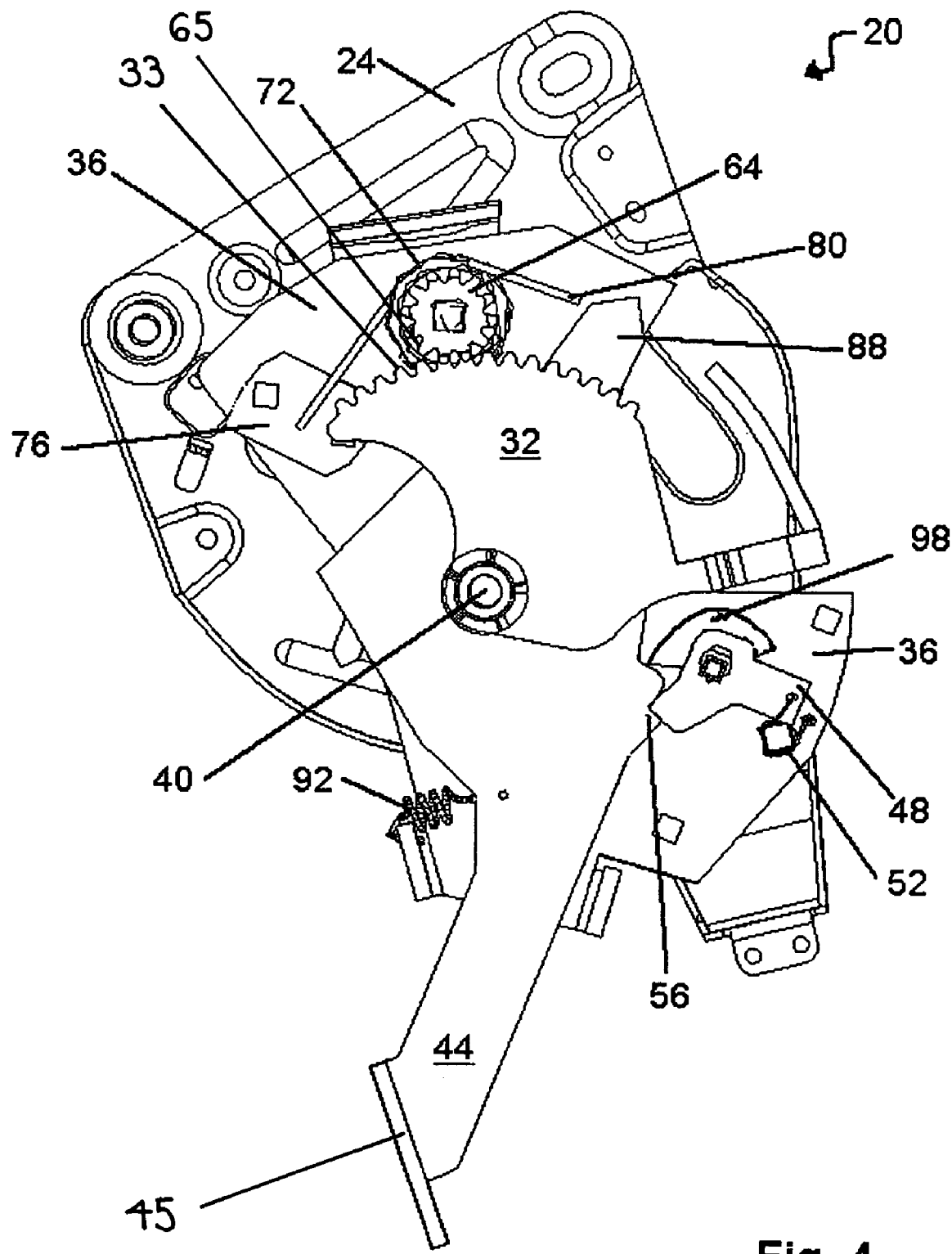
FIG. 4 shows a side view similar to that of FIG. 2 but wherein the pedal has been pressed to tension a control cable.

When pawl 48 is engaged in notch 56, when system 20 is not tensioning the control cable 85, pressing pedal arm 44 results in carriage 36 rotating with pedal arm 44, as shown in FIG. 4 wherein pedal arm 44 has been almost fully depressed and the bore 50 in pawl 48 moves with respect to pin 54 to set pawl 48 into its next state. As carriage 36 rotates, gear 64 moves along geared rack 32 and tightens the parking brake cable (not shown). Clutch spring 72 engages clutch hub 68 to prevent gear 64, and carriage 36, from rotating in a clockwise manner to release the tension on the brake cable when pressure is removed from pedal arm 44 by a vehicle operator.

Figure 5:
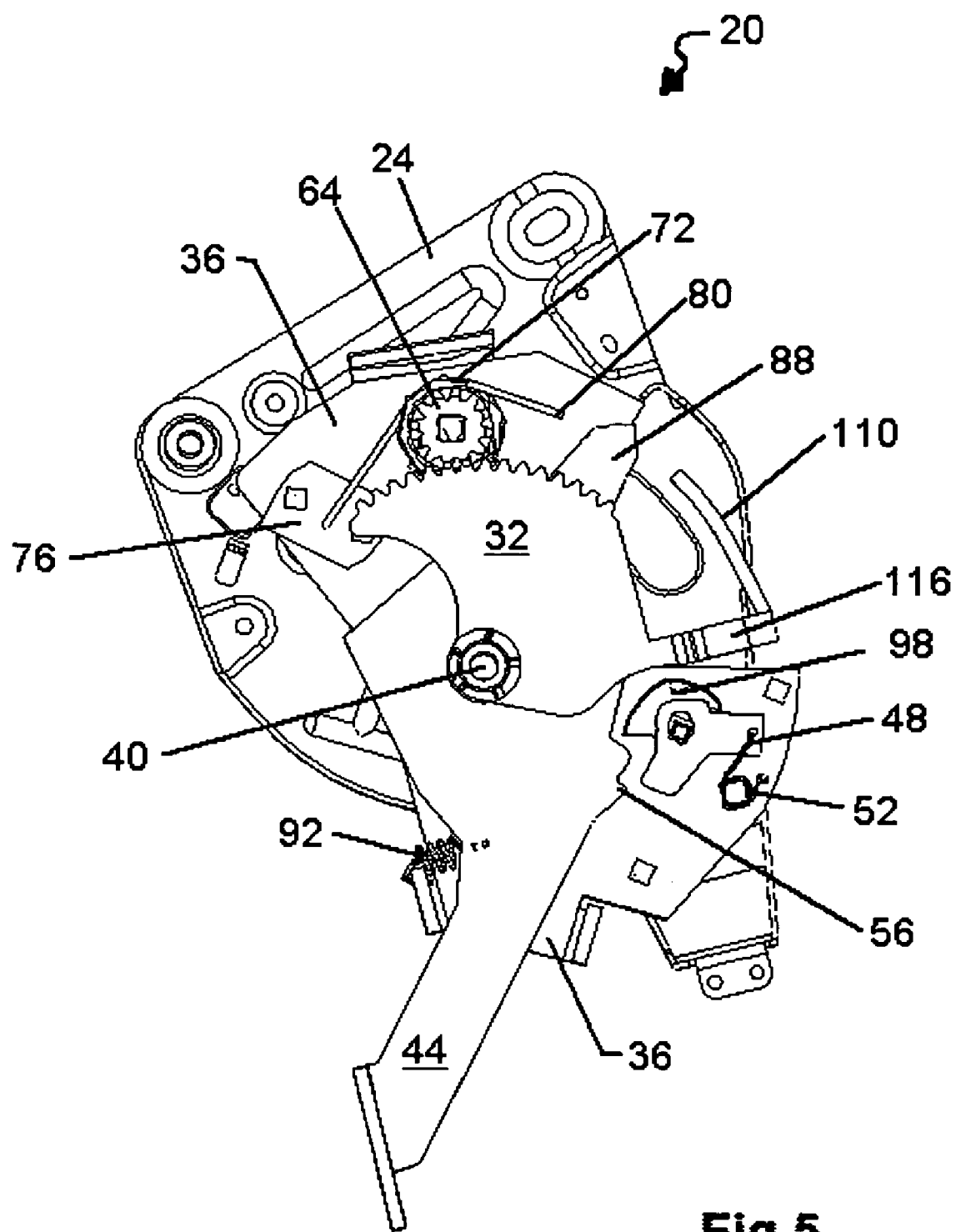
FIG. 5 shows a side view similar to that of FIG. 4 but wherein the pedal has been released after the cable has been tensioned.

When the vehicle operator ceases pressing pedal arm 44, a return spring 92, which acts between carriage 36 and pedal arm 44, moves pedal arm 44 to the position shown in FIG. 5 and pawl 48 is then moved out of engagement with notch 56 by spring 52. As the bore 50 in pawl 48 has moved with respect to pin 54, pawl 48 will not re-engage notch 56 until pawl 48 is reset.

Figure 6:
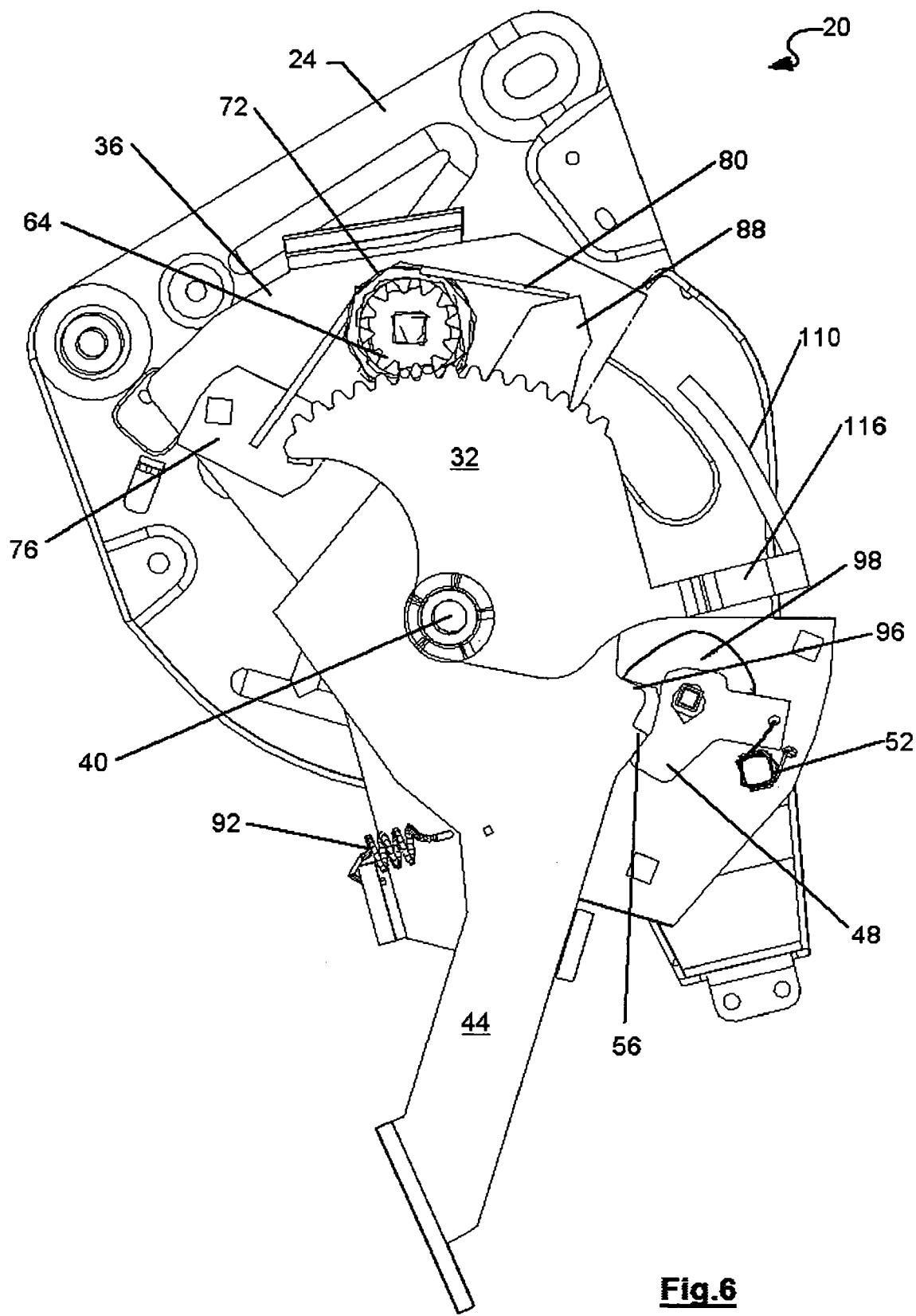
FIG. 6 shows a side view similar to that of FIG. 4 but wherein the pedal has been pressed again to release the clutch of the quiet apply mechanism.

When pawl 48 is disengaged, pressing on pedal arm 44 results in pedal arm 44 rotating with respect to carriage 36 as shown in FIG. 6, rather than rotating with carriage 36 as before. Thus, when pressure is next applied to pedal arm 44 by a vehicle operator, release tab 88 at the uppermost end of pedal arm 44 is rotated to engage and lift release end 80 of clutch spring 72, disengaging clutch spring 72 from clutch hub 68.

Further, leading edge 96 of notch 56 engages toggle 98 which rotates and biases pawl 48 such that it is reset, the bore 50 moves with respect to pin 54 within, so that pawl 48 will re-engage notch 56 when pedal arm 44 is moved back, by return spring 92, to its initial position (shown in FIG. 1) with respect to carriage 36.

When release tab 88 lifts release end 80, the tension on the parking brake cable, typically augmented by a spring at the parking brake mechanism, causes pedal arm 44 and carriage 36 to rotate back to their initial positions (shown in FIG. 1) as the vehicle operator eases the applied pressure off pedal arm 44.

Figure 7:
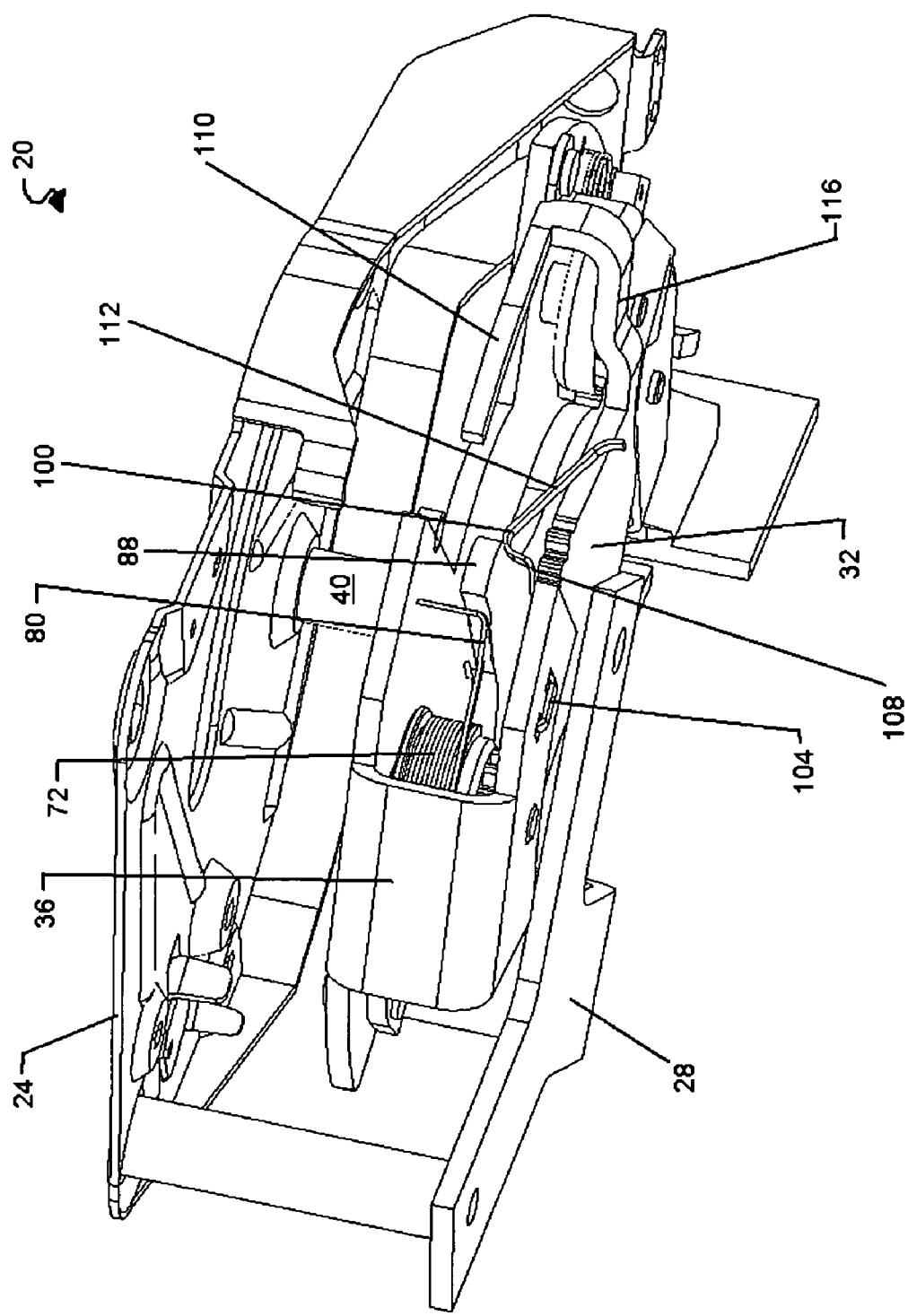
FIG. 7 shows a perspective view of the quiet apply mechanism and a retainer spring.

As shown in FIG. 7, two different mechanisms are employed to ensure clutch spring 72 is released throughout the desired range of movement of pedal arm 44. First, release tab 88 is kept in contact with release end 80 by a retainer spring 100 which is mounted to carriage 36 adjacent to quiet apply mechanism 60. Retainer spring 100 includes a first end 104, which is fixed to carriage 36, and a free distal end 105. The retainer spring 100 also includes a detent 108 and an inclined edge 112 distal first end 104. When release tab 88 is engaged with release end 80, detent 108 maintains release tab 88 in that position (as shown in FIG. 7) until inclined edge 112 of retainer spring 100 is moved away from release tab 88.

Second, while release end 80 is lifted by release tab 88, and as pedal arm 44 rotates to release pressure on the control cable 85, release end 80 engages and rides upon release surface 110 on rack 32. As carriage 36 rotates back to its initial position, as shown in FIGS. 1 and 2 inclined edge 112 abuts a retaining spring release surface 116 on geared rack 32. As inclined edge 112 abuts release surface 116, spring 100 is deformed, moving detent 108 out of engagement with release tab 88, allowing release tab 88 to disengage release end 80 of clutch spring 72. Release end 80 riding upon release surface 110 maintains release end 80 in the released position until pedal arm 44 and carriage 36 have returned to its start position and the tension in the control cable 85 has been released. At this point, release end 80 moves to its initial position, allowing clutch spring 72 to re-engage clutch hub 68. System 20 is now again in the initial position and configuration of FIG. 1 and is ready for the next tension and release cycle.

Another advantage of the present invention is that, in previous push to release mechanisms, the push force required to commence the release operation was the force required to overcome the tension in the control cable 85. Thus, a very high force would be required to release the mechanism if the control cable 85 was highly tensioned. In contrast, in the present invention, the push force required to commence the push to release operation is set by the spring constant of return spring 92. Pushing pedal arm 44 with sufficient force to over come the spring force of return spring 92 will cause pedal arm 44 to rotate with respect to carriage 36, bringing release tab 88 into engagement with release end 80 and commencing the release operation.

As will now be apparent, the present invention provides a system allowing a push to engage and push to release mechanism to tension and release a cable, such as a parking brake actuator cable, employing a "quiet apply" mechanism, avoid the requirement for a ratchet mechanism and its related noise. The system is relatively simple to construct, compact and reliable.

The above-described embodiments of the invention are intended to be examples of the present invention and alterations and modifications may be affected thereto, by those of skill in the art, without departing from the scope of the invention which is defined solely by the claims appended hereto.

I claim:

1. A quiet apply push to release control pedal system to apply and remove tension from a control cable, comprising:
   a frame for attachment to a vehicle;
   a geared rack spaced from and mounted to the frame;
   a pedal arm rotatably mounted to a pivot pin on the frame, the pedal arm having a pedal at one end and a release tab at the other end;
   a quiet apply carriage rotatably mounted to the pivot pin, the quiet apply carriage including:
   a cable carrier to which the control cable is attached;
   a pawl and toggle mechanism, the pawl engaging the pedal arm, when the pedal arm is pushed to tension the control cable, to rotate the carriage with the pedal about the pivot pin and the toggle re-engaging the pawl with the pedal when the pedal is released after tensioning the cable;
   a quiet apply mechanism including a clutch hub, a clutch spring surrounding the clutch hub and a gear attached to the clutch hub and having teeth complementary to those of the geared rack, the gear engaging the geared rack to rotate the clutch hub when the carriage is rotated on the pivot pin, the clutch spring being biased into engagement with the clutch hub to prevent removal of tension from the control cable until a release end of the clutch spring is pressed by the release tab of the pedal arm when the pedal is pressed to release tension from the cable; and
   a retainer spring having a first end fixed to the carriage, a free distal end having an inclined edge and a detent intermediate the first end and the inclined edge, the detent maintaining the release tab of the pedal arm engaged with the release end of the clutch spring when the pedal is pressed to release the tension in the control cable until the release tab engages a release surface on the geared rack and the inclined edge then abuts a release surface on the geared rack to deform the spring to disengage the release tab when the pedal and carriage have returned to the disengaged position and wherein the pawl re-engages the pedal arm.

* * * * *